United States Patent
Dijkhuis et al.

(10) Patent No.: US 8,206,765 B2
(45) Date of Patent: Jun. 26, 2012

(54) PREPARATION OF INDIVIDUALLY COATED EDIBLE CORE PRODUCTS

(75) Inventors: Mia Dijkhuis, Maarssen (NL); Marco Michielsen, Amsterdam (NL); Rob Van Temmen, Zaandam (NL); Joop Vrees, Heemstede (NL)

(73) Assignee: Frito-Lay Trading Company Europe GmbH, Berne (CH)

( * ) Notice: Subject to any disclaimer, the term of this patent is extended or adjusted under 35 U.S.C. 154(b) by 767 days.

(21) Appl. No.: 12/192,808

(22) Filed: Aug. 15, 2008

(65) Prior Publication Data
US 2010/0040742 A1 Feb. 18, 2010

(51) Int. Cl.
*A21D 13/00* (2006.01)
(52) U.S. Cl. .......................................... 426/94; 426/549
(58) Field of Classification Search .................. 426/94, 426/549
See application file for complete search history.

(56) References Cited

U.S. PATENT DOCUMENTS

| | | | |
|---|---|---|---|
| 2,085,494 A * | 6/1937 | Ferry | 99/405 |
| 4,663,175 A | 5/1987 | Werner et al. | |
| 4,844,930 A * | 7/1989 | Mottur et al. | 426/438 |
| 4,961,943 A | 10/1990 | Blanthorn et al. | |
| 5,424,085 A | 6/1995 | Hsieh et al. | |
| 5,433,961 A | 7/1995 | Lanner et al. | |
| 5,571,546 A | 11/1996 | Kristinus et al. | |
| 5,911,488 A * | 6/1999 | Geromini et al. | 34/508 |
| 6,156,361 A | 12/2000 | Gilgen | |
| 6,500,474 B2 | 12/2002 | Cross et al. | |
| 2002/0187220 A1 | 12/2002 | Luhadiya | |
| 2004/0067282 A1 | 4/2004 | Karwowski et al. | |
| 2005/0214414 A1 | 9/2005 | Miranda et al. | |
| 2006/0110493 A1 | 5/2006 | Schnieber et al. | |

FOREIGN PATENT DOCUMENTS

| | | |
|---|---|---|
| EP | 0169319 | 1/1986 |
| EP | 1524915 | 4/2005 |
| EP | 1550378 | 6/2005 |
| NL | 9500537 A | 11/1996 |
| NL | 1026332 | 12/2005 |
| WO | 91/15548 | 10/1991 |
| WO | 94/18858 | 9/1994 |
| WO | 95/12990 | 5/1995 |
| WO | 99/25202 | 5/1999 |
| WO | 99/34691 | 7/1999 |
| WO | 00/54606 | 9/2000 |
| WO | 02/11554 | 2/2002 |
| WO | 02/091864 | 11/2002 |
| WO | 2004/010793 | 2/2004 |
| WO | 2004/016116 | 2/2004 |
| WO | 2004016103 A1 | 2/2004 |
| WO | 2004/032654 | 4/2004 |

* cited by examiner

*Primary Examiner* — D. Lawrence Tarazano
*Assistant Examiner* — Jenna A Watts
(74) *Attorney, Agent, or Firm* — Colin P. Cahoon; Celina M. Orr; Carstens & Cahoon, LLP

(57) ABSTRACT

A method and apparatus for producing individually coated, baked, edible core products is disclosed. Individual edible cores are coated with a farinaceous dough and baked. The coated cores are agitated as their coatings expand to prevent them from clumping or agglomerating during baking. The baked, coated cores are individual core pieces with an expanded, crispy coating.

8 Claims, 1 Drawing Sheet

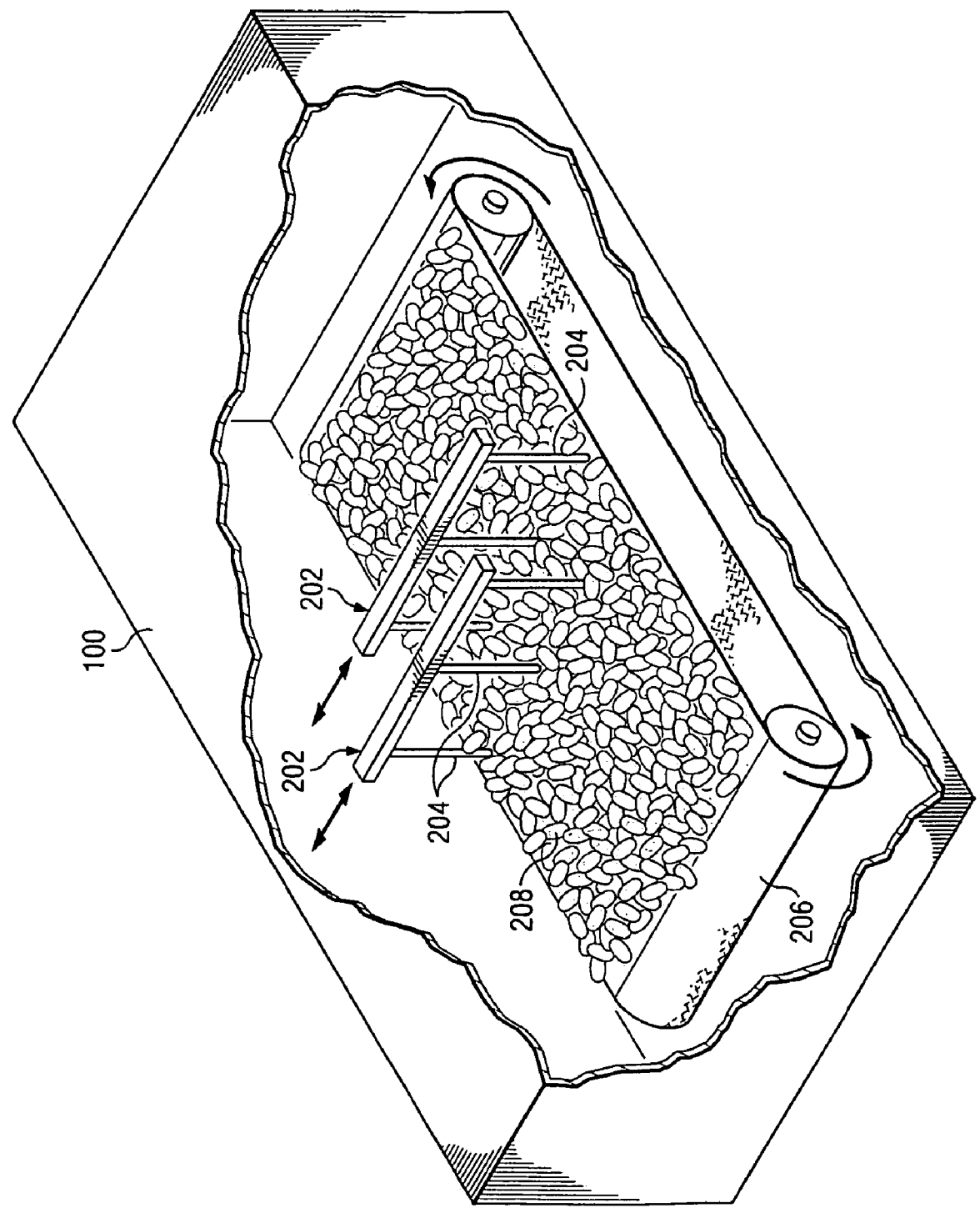

PREPARATION OF INDIVIDUALLY COATED EDIBLE CORE PRODUCTS

BACKGROUND OF THE INVENTION

1. Technical Field

The present invention relates to a method, of making individually coated, baked edible cores, and an apparatus therefor.

2. Description of Related Art

Coated edible cores, or coated food particulates, comprise a generally cohesive core food product, such as a nut or piece of fruit, which has been coated with a material that modifies or enhances the flavor or texture properties of the core, and cooked. Examples of coated edible cores are chocolate coated nuts, honey roasted nuts, and chocolate covered raisins.

Some coated edible core products must be baked, fried, or otherwise dehydrated at high temperatures in order to provide a dried, expanded coating. Fried snack products have become less desirable from a consumer standpoint in recent years, and baked goods have shown increased popularity. Baked snack products can be produced using a farinaceous dough. Problems arise, however, when edible core materials are coated with a farinaceous dough and dried on a belt in a traditional single pass or multi-pass oven. In particular, the coated core pieces tend to adhere to one another in clumps at the conclusion of the baking process. If the adhered core pieces ate dislodged from one another after baking, significant product breakage and non-uniformity of the final product result. If the core pieces are left together, difficulties are encountered in metering, packaging and quality control.

The prior art has attempted to solve this problem in several ways. One prior art method is to severely underload the oven belt with coated core materials such that the cores are dried on the belt in monolayer, not touching one another. Although this method might accomplish the goal of reducing the agglomeration or sticking together of the core pieces, it unduly limits throughput, as the oven belts have the ability to be loaded with coated core materials several layers thick, and increases the cost of making these products because the oven is not operating at full efficiency or capacity. Another prior art method is to bake the coated edible cores in a rotating kiln-type oven. This type of oven is basically a rotating drum that constantly agitates the coated core materials as they cook. While this method may reduce agglomeration of the core pieces, it also suffers from problems of reduced throughput and increased capital and operational cost of the equipment used. Furthermore, existing equipment cannot be readily or easily modified to provide a rotating kiln-type oven. Still another prior art method is to provide a physical barrier on the outside of the farinaceous dough coating, such as sesame seeds, to prevent the coated core materials from sticking together during processing. This method has the drawback of providing a completely different product than simply an edible core material with a farinaceous dough coating and severely limits the range of products that can be created. Finally, the prior art has attempted to reduce the stickiness of the core materials by providing a coating with very low moisture. This method is inadequate because one of the reasons farinaceous dough-based products are so desirable for consumers is that the dough will expand and become flaky as the water in the dough forms steam and escapes from the dough. Limiting the amount of water in the dough, therefore, will prevent the coated core material from forming a desirable expanded, crispy texture.

It would be an improvement in the art, therefore to provide individual baked edible core materials with an expanded, crispy coating that is produced with minimal capital and operational costs.

SUMMARY OF THE INVENTION

The present invention is a method and apparatus designed to provide individual baked, coated, edible cores that do not adhere to one another during processing. Core materials, such as nuts, are coated in a rotating drum. The cores are coated with a farinaceous dough comprising starches. The coated cores are then transferred to a belt and through a hot air oven dryer. In order to prevent the cores from adhering to one another as they dry in the oven, the coated nuts on the belt are agitated before steam begins to form in the dough coating and the coating has begun to expand. The agitation ends when the coated cores no longer appreciably adhere to one another. The apparatus used to agitate the nuts on the belt is preferably a raking apparatus disposed above the belt with a plurality of fingers that travel back and forth laterally along the width of the belt. In one embodiment, the rake fingers are attached to a member disposed above the belt with a lengthwise axis substantially parallel to the belt's width. The finished product comprises individual edible core materials, each with an expanded, crispy coating, that are not adhered to one another. The center portion comprises nuts, fruits, or the like.

BRIEF DESCRIPTION OF THE DRAWINGS

The novel features believed characteristic of the invention are set forth in the appended claims. The invention itself, however, as well as a preferred mode of use, further objectives and advantages thereof, will be best understood by reference to the following detailed description of illustrative embodiments when read in conjunction with the accompanying drawing, wherein:

FIG. 1 depicts a perspective view of one embodiment of the apparatus of the present invention.

DETAILED DESCRIPTION

An apparatus and method for making individual baked, coated edible core materials is disclosed. Unless stated otherwise, all percentages used herein are by weight unless otherwise noted.

In a first processing step, individual core pieces are provided. In a preferred embodiment, the individual core pieces are nuts (whole or pieces). In a most preferred embodiment, the individual cores are peanuts or cashews. In a preferred embodiment, the nuts are dry roasted or pre-fried peanuts or dry roasted cashews. Preferably, the moisture content of the core pieces is between about 2.0% and about 3.5%.

The core pieces are then coated with a farinaceous dough coating. In one embodiment, the cores are coated in a rotating drum with two separate spraying systems inside. As the cores are tumbled inside the drum, each sprayer will distribute either an aqueous liquid slurry or a dry mixture into the drum. The cores are thus coated with a hydrated dough mixture that results from the combination of the liquid slurry and the dry mixture. In one embodiment, both spraying systems are cycled on and off at the same time. In another embodiment, multiple spraying cycles are used. This technique is sometimes referred to as panning. Multiple spray cycles are used to create a plurality of distinct dough coating layers over the cores. When the multi-layered coating later expands in the oven, it imparts a desirable flaky, crispy texture to the baked, coated edible core.

In one embodiment, the aqueous liquid slurry comprises water. In a preferred embodiment, the aqueous slurry comprises water and a carbohydrate, such as maltodextrin, with a Dextrose Equivalent value of less than about 20, and preferably about 18. The low DE carbohydrate has a longer molecular chain, which helps bind water to the coating, which in turn aids in the controlled expansion of the coating during baking. Another coating ingredient that aids water binding and controlling expansion is salt. If the outer surface of the coated cores dries more quickly than the inner portion, as would be expected, the now dry salt in the outer cores helps pull moisture from below the outer surface and maintain uniform drying and expansion. Uncontrolled expansion due to low water binding will result in exploded centers.

In one embodiment, the liquid slurry comprises between about 55% and about 60% water, between about 22% and about 27% maltodextrin, between about 8% and about 11% sugar, and between about 4% and about 6% salt. In a preferred embodiment, the liquid slurry comprises about 58% water, about 25.5% maltodextrin, about 9.5% sugar, and about 4.5% salt. The liquid slurry can also comprise seasonings and other flavoring agents, as desired.

In one embodiment, the dry mixture comprises a flour and starch mixture. In a preferred embodiment, modified starches are used as an ingredient in the coating mixture. Whereas moisture tends to cling to the exterior of a native starch granule, modified starch granules are able absorb more moisture into the granule. Here again, the water binding properties of the ingredients chosen are important. When modified starches are used in the coating of the present invention, the water escapes from the granule as steam during heating, causing the granule to expand in a controlled fashion. The wet granules in the coating also form a matrix or network that expands as the water escapes as steam during baking. The result is an expanded, flaky coating.

In one embodiment, the dry mixture comprises between about 15% and about 25% wheat flour, between about 15% and about 25% corn flour, between about 35% and about 45% modified waxy corn starch (comprising about 100% amylopectin), and between about 15% and about 25% pregelatinized corn starch (comprising about 75% amylopectin and about 25% amylase). In a preferred embodiment, the dry mixture comprises about 20% wheat flour, about 20% corn flour, about 40% modified waxy corn starch (comprising about 100% amylopectin), and about 20% pregelatinized corn starch (comprising about 75% amylopectin and about 25% amylase). The dry mixture can also comprise seasonings and other flavoring agents, as desired.

After the liquid slurry and dry mixture are combined in the tumbler and coated onto the cores, the cores are surrounded by a dough coating. In one embodiment, the coated cores comprise between about 30% and about 40% core material, between about 35% and about 45% dry mixture, and between about 20% and about 30% liquid slurry. In one embodiment, the dough coating itself comprises a moisture content of between about 15% and about 25%. The bulk density of the coated nuts before baking is between about 700 grams per liter and about 750 grams per liter. The thickness of the coating is between about 1.5 millimeters and about 2.5 millimeters, and preferably about 2 millimeters.

The coated cores are primarily dried on a belt in a hot air oven. In one embodiment, the coated cores are loaded onto a belt using an oscillating loader. The oscillating loader spreads the coated cores evenly across the width of the oven belt. The cores then travel through the oven where hot air is blown on them. In a preferred embodiment, the oven is a two-zone oven, with a first zone that blows hot air over the cores from below the belt, and a second zone that blows hot air over the cores from above the belt. As the cores pass through the first oven zone, the dough coating begins to heat up. At a certain point, depending largely on the ingredient formulation and the oven conditions, the water in the dough coating will begin to vaporize and escape from the coating, thereby drying and expanding the coating. As the coating dries, the outer surface of the coated cores becomes less sticky. Therefore, the inventors herein have determined that it is most efficient to begin agitating the coated cores on the belt just before the coating expansion process has begun. In a preferred embodiment, the agitation begins less than 30 seconds before the coating begins expanding. In one embodiment, the air temperature inside the first zone of the oven (that is, the zone in which the bulk of the expansion takes place) is between about 120° C. and about 180° C. In a preferred embodiment, the air temperature is between about 140° C. and about 150° C. In one embodiment, the oven belt speed is between about 35 centimeters per minute and about 45 centimeters per minute.

The point at which the coating begins expanding is when the water in the coating begins to turn into steam. Thus, the coating begins to expand approximately when the temperature of the coating reaches the boiling point of water. The specific temperature at which water begins to boil depends on the coating formulation and the oven conditions, but at atmospheric pressure is typically about 100° C.

The agitation can then end after the exterior surfaces of the cores have reduced stickiness to a point where the coated cores no longer adhere to one another in the oven. Again, the time frame during which this occurs will vary widely depending on specific product formulations and oven conditions. The point at which the cores cease adhering to one another can be determined by one skilled in the art, according to the teachings herein, by visual inspection. In one embodiment, the agitation begins less than 30 seconds before the coating begins to expand. In another embodiment, the agitation occurs for between about 75 seconds and about 175 seconds. In a preferred embodiment, the agitation occurs for about 90 seconds.

Agitating the coated cores during the entire drying process uses needless energy and may unnecessarily damage the coating before it has a chance to become firm. Conversely, beginning agitation of the coated cores too long after the dough coating has begun drying and expanding may cause breakage of the coating where two adjacent cores have already begun to fuse together. Again, generally, the expansion and drying process will begin once the temperature of the coating reaches approximately 100° C., the boiling point of water, although that point may vary to some degree depending on the particular coating formulation. The inventors herein have determined that, surprisingly, existing belt ovens can be modified with an agitation apparatus that is designed and placed such that the coated cores are agitated just before expansion of the coating begins until the coated pieces no longer agglomerate.

In one embodiment, the cores are agitated using a raking apparatus inside the oven. One embodiment of the raking apparatus is depicted in FIG. 1. As depicted therein, the oven 100 contains a conveyor belt 206, which carries the coated cores 208 from one end to the other through the oven. One skilled in the art will appreciate that the conveyor belt can travel through the oven; it is not necessarily wholly contained within the oven. The raking apparatus comprises at least one member 202 disposed above the belt 206 approximately parallel to the width of the belt 206, wherein said at least one member comprises a plurality of fingers 204 extending towards the belt and into the layer of coated cores 208. The fingers 204 should extend far enough that the coated cores 208 adjacent to the belt 206 are agitated when the member is moved.

The member 202 oscillates laterally along the width of the belt, thereby causing the fingers 204 to agitate the layer of coated cores 208 on the belt 206, which in turn causes the cores 208 to move relative to one another and touch at previously exposed surfaces. The member 202 can be moved in a lateral direction along the width of the belt using a motor, a hydraulic actuator or similar mechanism (not shown in FIG. 1) or other method known in the art. In one embodiment, walls (not shown in FIG. 1) are provided on the sides of the belt 206 to prevent the cores from falling off the sides of the belt during agitation. In a preferred embodiment, at least two members 202 containing fingers 204 are disposed above the belt 206. The fingers are preferably offset from one another, and set far enough apart from one another that significant drying of the exposed coating can occur between the sets of fingers. The number of members and fingers needed depends heavily on the product formulations sand oven processing conditions. The previously exposed surfaces, having had exposure to the oven, will have reduced stickiness and therefore reduce the likelihood, that the cores will adhere to one another when the previously exposed surfaces come into contact with one another. The agitation is only necessary until most of the outer surface of each of the coated cores has been exposed to the oven (or, not touching the outer surface of another coated core) for enough time to dry out just enough to reduce its stickiness. After that point, the agitation can cease and the coated cores can continue to be dried unagitated on the belt until the coating reaches its final moisture content of less than about 3% by weight. At the end of the oven drying process, the individual coated edible cores are not adhered to one another, and do not present the breakage or packaging problems noted in the prior art. The cores also have an expanded, crispy coating that is desirable by consumers.

The raking apparatus used with one embodiment of the present invention has several advantages over the prior art. First, existing belt ovens can be easily modified to add the raking mechanism. Prior art rotating kiln-type ovens require substantially more capital and operating cost. Second, the coated cores can be agitated for only the amount of time that is absolutely required to prevent agglomeration of the dried, coated cores. Rotating kiln-type ovens agitate the coated cores long before, and long after, it is necessary to do so. This also increases costs, processing time and potentially breakage/defects. Third, a belt-driven oven modified with the raking apparatus of the present invention can easily be used to bake products that do not require agitation by simply disengaging the raking apparatus.

In one embodiment, the baked, coated cores have a bulk density between about 310 grams per liter and about 350 grams per liter. Additionally, in a preferred embodiment, less than 5% by total weight of the baked, coated cores are adhered to one another in clumps or clusters. The final product comprises a total moisture content between about 2% and about 3%, with a preferred embodiment having a moisture content of about 2.4%.

In another embodiment, core materials with a moisture content near the upper end of the preferred moisture range, approximately 3.5%, are coated and baked. Because more moisture escapes the core during baking, the coating can expand enough to leave some space between to coating and the core. Such an embodiment can provide the practitioner of the present invention the opportunity to give consumers more variety in the snack products produced. This embodiment would produce a product whereby the core is able to "rattle" inside the outer coating.

EXAMPLE 1

Pre-fried peanuts comprising a moisture content of about 2.8% were placed into a coating tumbler. The peanuts were sprayed with a liquid slurry comprising 57.9% water, 25.6% maltodextrin, 2.13% liquid bouillon flavor, 4.3% salt, 9.5% sugar, and 0.6% caramel (color). At the same time, the peanuts were sprayed with a dry mixture comprising 20% wheat flour, 20% corn flour, 40% modified corn starch (comprising about 100% amylopectin), and 20% pregelatanized corn starch (comprising about 75% amylopectin and about 25% amylase). The peanuts were tumbled in the liquid slurry and dry mixture for about 500 seconds.

The coated peanuts were then transferred onto a conveyor belt and through a dual zone, hot air oven. The first oven zone moved air at a temperature of about 145° C. from below the belt, and the second zone moved air at a temperature of about 145° C. from above the belt. A raking apparatus was mounted above the conveyor belt in the first zone of the oven. The raking apparatus comprised four members disposed laterally above the belt, with each member comprising 6 fingers extending towards the belt. One motor was used to actuate each pair of members by oscillating each of them laterally along the width of the belt.

The conveyor belt speed was about 42 centimeters per minute. The coated nuts reached the raking apparatus after approximately 170 seconds, and were agitated by the raking apparatus for about 90 seconds. The coated nuts continued through the oven, and exited at a total moisture content of about 2.4%, and had an average bulk density of about 333 grams per liter. The dried, coated nuts comprised less than 4% broken coatings and less than 5% clusters.

What is claimed is:

1. A method for producing a coated, edible core material, said method comprising:
    coating a plurality of individual edible core materials with a dry mixture and a liquid slurry to make a farinaceous dough coating having a moisture content between about 20% and about 40% by weight to produce coated cores;
    baking said coated cores in a hot air oven wherein said baking occurs on a belt in said oven; and
    agitating said cores during said baking for a time period beginning before said coated cores begin to expand and ending when said coated cores cease adhering to one another, wherein said agitating comprises agitating said cores with a plurality of fingers oscillating laterally across said belt.

2. The method of claim 1 wherein said agitating begins less than 30 seconds before said coated cores begin to expand.

3. The method of claim 1 wherein said farinaceous dough comprises a modified waxy corn starch and a carbohydrate with a Dextrose Equivalent of less than about 20.

4. The method of claim 1 wherein said dry mixture comprises between about 15% and about 25% wheat flour, between about 15% and about 25% corn flour, between about 35% and about 45% modified waxy corn starch comprising about 100% amylopectin, and between about 15% and about 25% pregelatinized corn starch comprising about 75% amylopectin and about 25% amylase.

5. The method of claim 1 wherein said liquid slurry comprises between about 55% and about 60% water, between about 22% and about 27% maltodextrin, between about 8% and about 11% sugar, and between about 4% and about 6% salt.

6. The method of claim 1 wherein said time period comprises between about 75 seconds and about 175 seconds.

7. The method of claim 1 wherein said coated cores comprise nuts.

8. The method of claim 1 wherein said coated cores comprise at least one of pre-fried peanuts, dry roasted peanuts, and dry roasted cashews.

* * * * *